United States Patent [19]

Sand

[11] 4,093,699
[45] June 6, 1978

[54] SYNTHETIC ZEOLITE

[75] Inventor: Leonard B. Sand, Holden, Mass.

[73] Assignee: Zeochem Corporation, Worcester, Mass.

[21] Appl. No.: 740,733

[22] Filed: Nov. 10, 1976

Related U.S. Application Data

[63] Continuation of Ser. No. 543,652, Jan. 24, 1975, abandoned, which is a continuation of Ser. No. 334,125, Feb. 20, 1973, abandoned, which is a continuation of Ser. No. 148,730, Jun. 1, 1971, abandoned.

[51] Int. Cl.² .............................................. C01B 33/28
[52] U.S. Cl. .................................. 423/118; 423/328; 423/330
[58] Field of Search ............... 423/328, 329, 330, 118; 252/455 Z

[56] References Cited

U.S. PATENT DOCUMENTS

| 2,950,952 | 8/1960 | Breck et al. | 423/328 |
| 3,216,789 | 11/1965 | Breck et al. | 423/328 |
| 3,578,398 | 5/1971 | Jenkins | 423/329 X |
| 3,674,425 | 7/1972 | Robson | 423/329 X |

FOREIGN PATENT DOCUMENTS

| 1,188,043 | 4/1970 | United Kingdom | 423/328 |

Primary Examiner—Edward J. Meros
Attorney, Agent, or Firm—Norman S. Blodgett; Gerry A. Blodgett

[57] ABSTRACT

Method for making a zeolite having the structure of offretite, consisting of reacting in a closed container under autogenous pressure in the absence of tetramethylammonium ions, a composition having specific mole rations of $K_2O$, $Na_2O$, $SiO_2$, $Al_2O_3$, and $H_2O$.

4 Claims, 4 Drawing Figures

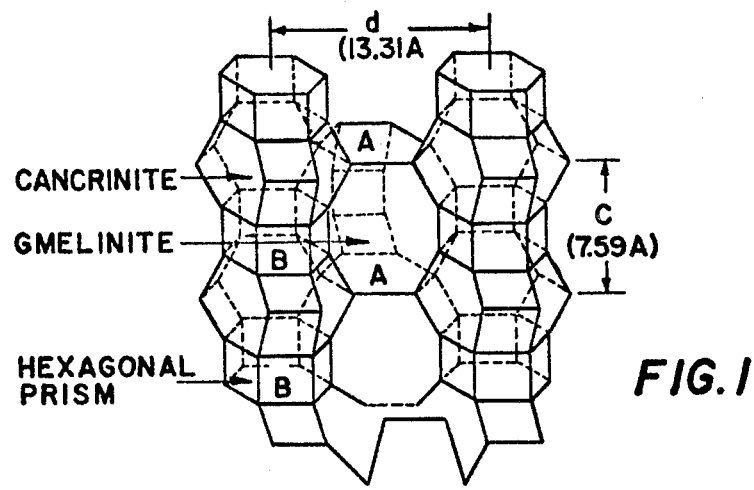
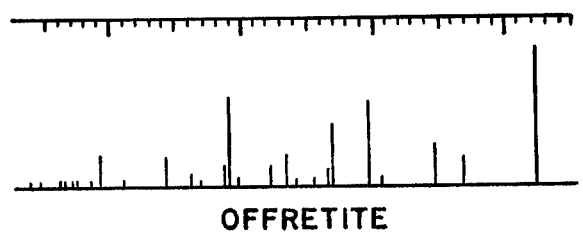
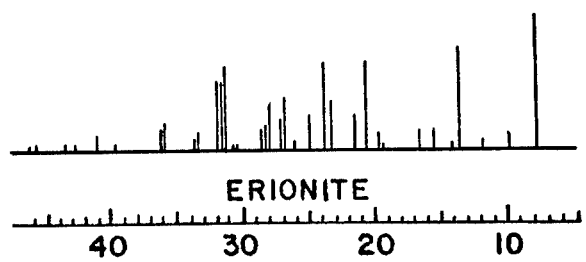
DIAGRAMMATIC REPRESENTATION OF X-RAY POWDER DIFFRACTOMETER PATTERNS FOR OFFRETITE AND ERIONITE (15).

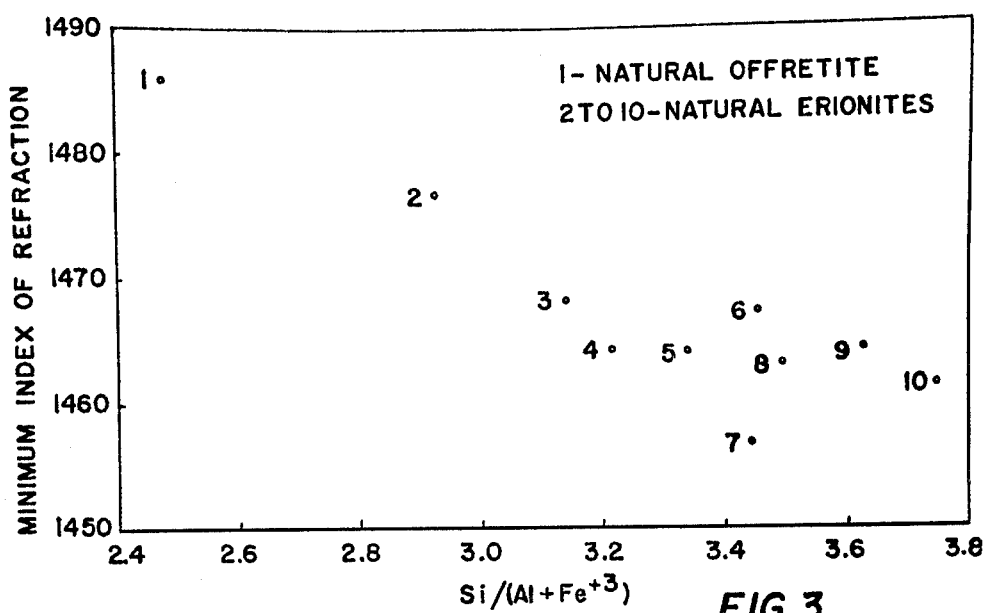
FIG.3
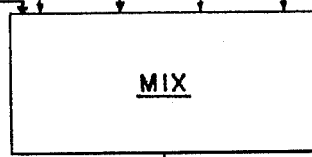
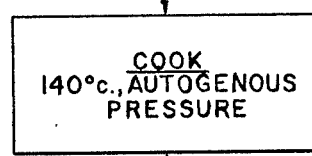
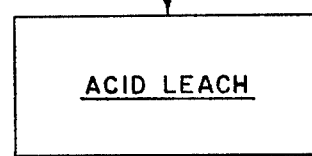
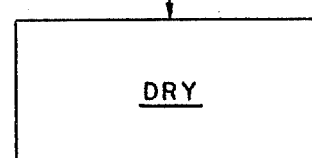
FIG.4

SYNTHETIC ZEOLITE

This is a continuation, of application Ser. No. 543,652 filed Jan. 24, 1975, now abandoned, which is a continuation of application Ser. No. 334,125 filed Feb. 20, 1973, now abandoned, which is a continuation of application Ser. No. 148,730 filed Jun. 1, 1971, now abandoned.

BACKGROUND OF THE INVENTION

Until recently there has been a tendency to confuse the zeolites erionite and offretite. Recent work has shown that they are substantially different. Erionite from Oregon was first recognized as a new mineral in 1898 by Eakie (Amer. J. Sci., 6, 66-1898). He named it after the Greek word for wool because of its fibrous appearance. In 1959 Deffeys (3) (Am. Minerol., 44, 501-1959) reported the zeolite in tuffaceous sedimentary rocks of Cenozoic age in Nevada, South Dakota and Wyoming. Erionite subsequently has been identified from many deposits in the western United States where it occurs chiefly in altered silicic tuffs of upper Cenozoic lacustrine deposits. The largest deposits of erionite are found in the desert areas of southern California, central Nevada, and southeastern Oregon. It also has been found in some parts of Russia. Offretite was first described in 1890 by Professor Gonnard as a new zeolite in amygdaloidal basalt at Mount Simionse near Montbrison. Loire, France. He named it after Professor Offret of Lyons. Except for a probable occurrence in basalt from Palau Island, Carolina Islands, no other occurrence of offretite has been reported, The relationship between erionite and offretite was investigated first by Hey and Fejer (10), (Minerol. Mag. 33, 66-1962) who concluded that the two zeolites gave identical x-ray powder photographs. Hey and Fejer suggested that only one name was necessary and that the name offretite had priority. The identity of offretite had been misinterpreted earlier by Strunz (1956), who indicated that offretite was identical with phillipsite on the basis of x-ray study of material from Montbrison. Strunz probably examined phillipsite rather than offretite.

Recently, Bennett and Gard (Nature, 214, 1005-1967) proposed a structural basis for distinguishing erionite from offretite. Electron diffraction and x-ray single crystal studies have shown that the unit cell of offretite is hexagonal, with $a_O=13.31$, $c_o=7.59A$; that is, with the $c_o$ dimension half that of erionite. There are no systematically absent reflections. Streaks parallel to $c^*$ in electron diffraction patterns of some crystals suggested slight disorder due to stacking faults. Patterns from a synthetic specimen, Linde zeolite T, was more strongly streaked, and had diffused maxima which indicated a disordered intergrowth of erionite and offretite.

If is evident that erionite and offretite are two distinct but closely related minerals which can intergrow; both names, therefore, are valid. They can readily be distinguished by single crystal x-ray or electron diffraction analysis, but with less certainty by x-ray powder diffraction techniques. For finely divided samples electron diffraction can distinguish offretite from inter-growths with erionite, but x-ray powder diffraction techniques are inadequate. Using electron diffraction techniques specimens from seven localities were identified as ordered erionite by Bennett and Gard, but the Mount Simionse specimen was found to be the only natural offretite.

The port size is an important factor that influences the catalytic activity of molecular sieves. The port size must be larger than the reactant and produce molecules to allow diffusion of these species to and from the internal catalytically active surfaces. In most hydrocarbon conversion processes of commercial interest, only the large port molecular sieves, with ports of 7 to 10A are useful. This requirement limits the practical catalytic utilization of erionite, with effective pore diameters ranging from 4 to 6A, to molecules in this size range with critical mean diameters.

Offretite is similar to the erionite structure but differs in the stacking sequence and the resulting channel system parallel to the c axis. The secondary building units in offretite also are double six-membered rings and single six-membered rings, but offretite has a stacking sequence of AABAAB. Bennett and Gard proposed a hexagonal unit cell with the space group $P\bar{6}m2$. Its unit cell parameters are $a_o=13.31A$ and $c_o=7.59A$. The c-axis in offretite is half that of erionite. Offretite has wide channels parallel to $c$ formed by rings of twelve tetrahedra. In erionite this channel is blocked by off-set six-membered rings. Summaries of the structural properties of offretite are given in Table 1.

Table 1

| A summary of the structural properties of offretite |
|---|
| Space group - $P\bar{6}m2$ |
| Unit cell dimensions - $a_o = 13.29A$, $c_o = 7.58A$ (15) |
| Unit cell content - $(K_2, Ca)_2Al_6Si_{14}O_{40} \cdot 17H_2O$ |
| Stacking sequence - AABAAB |
| Density - Calculated - 2.372 gm/cc |
| Experimental - 2.13 gm/cc (15) |
| Al:Si ratio - 3:7 |
| Packing factor (calculated) - 0.5145 |
| Total pore volume (calculated) - 562.88$A^3$ |
| Unit cell volume - 1159.4$A^3$ |
| Calculated accessible pore volume - 337.3$A^3$ |
| Inaccessible pore volume - 225.58$A^3$ |
| Free diameter of 12-membered channel-7.6A |
| Free port diameter of six-membered ring -2.5A |
| Free pore diameter of hexagonal prism - 3.3A |

R. A. Sheppard and A. J. Gude (Amer. Minerol., 54, 875-1969) reported that the x-ray powder diffractometer patterns for offretite and erionite are similar; however, they differ sufficiently in detail to be distinguishable. FIG. 1 is a diagrammatic representation of the x-ray patterns. Table 2 gives the data for offretite.

Table 2

X-ray Powder Diffraction Data for Natural Offretite from Montbrison, France (15)

| hkl | dA Calculated | dA Observed | Relative Intensity I/Io × 100 |
|---|---|---|---|
| 100 | 11.51 | 11.50 | 100 |
| 001 | 7.58 | | |
| 110 | 6.64 | 6.64 | 20 |
| 101 | 6.33 | | |
| 200 | 5.76 | 5.76 | 35 |
| 111 | 4.99 | | |
| 201 | 4.58 | 4.58 | 4 |
| 210 | 4.35 | 4.35 | 59 |
| 300 | 3.83 | 3.83 | 43 |
| 002 | 3.79 | | |
| 211 | 3.77 | 3.77 | 11 |
| 102 | 3.60 | 3.60 | 3 |
| 301 | 3.42 | 3.42 | 2 |
| 220 | 3.32 | 3.32 | 22 |
| 112 | 3.29 | | |
| 310 | 3.19 | 3.19 | 17 |
| 202 | 3.16 | | |
| 221 | 3.04 | | |
| 311 | 2.94 | 2.94 | 3 |
| 400 | 2.88 | 2.88 | 64 |
| 212 | 2.85 | 2.85 | 15 |
| 302 | 2.69 | | |
| 401 | 2.69 | 2.69 | 3 |
| 320 | 2.64 | 2.64 | 4 |
| 003 | 2.52 | | |

Table 2-continued

The new analysis by Sheppard and Gude along with other analyses are given in Table 3.

Table 3

| | Chemical Composition of Erionite and Offretite | | | | | | | |
|---|---|---|---|---|---|---|---|---|
| | Offretite | | | | | | | Sheppard & Gude |
| | Ingram | Harada | Eakle | Staples & Gard | Hay | Eberly | Sheppard | |
| | France | Japan | Oregon | Oregon | Tanzania | Oregon | California | California |
| $SiO_2$ | 53.0 | 54.72 | 57.16 | 57.40 | 57.24 | 60.81 | 59.16 | 60.67 |
| $Al_2O_3$ | 18.1 | 15.24 | 16.08 | 15.60 | 13.93 | 13.59 | 13.44 | 12.90 |
| $Fe_2O_3$ | — | 1.04 | — | — | 1.85 | 3.63 | 1.48 | 1.35 |
| FeO | — | — | — | — | 0.20 | — | 0.05 | 0.09 |
| MgO | 2.0 | 1.17 | 0.66 | 1.11 | 0.15 | 0.80 | 0.26 | 1.09 |
| CaO | 4.1 | 4.32 | 3.50 | 2.92 | 0.00 | 1.54 | 0.21 | 0.65 |
| Na2O | — | 1.00 | 2.47 | 1.45 | 6.24 | 1.90 | 6.03 | 4.39 |
| $K_2O$ | 3.6 | 2.46 | 3.51 | 3.40 | 4.10 | 7.17 | 3.29 | 4.09 |
| $H_2O+$ | 17.7 | 19.12 | 17.30 | 17.58 | 8.18 | 10.57 | 8.10 | 7.69 |
| $H_2O-$ | 1.1 | | | | 7.08 | | 7.43 | 6.94 |
| $TiO_2$ | — | — | — | — | 0.32 | — | 0.15 | 0.09 |
| $P_2O_5$ | — | — | — | — | 0.04 | — | 0.03 | 0.02 |
| MnO | — | — | — | — | 0.28 | — | 0.03 | 0.03 |
| Total | 99.6 | 99.07 | 100.68 | 99.46 | 99.53 | 100.01 | 99.57 | 100.00 |

X-ray Powder Diffraction Data for Natural Offretite from Montbrison, France (15)

| hkl | dA Calculated | dA Observed | Relative Intensity I/Io × 100 |
|---|---|---|---|
| 410 | 2.51 | 2.51 | 20 |
| 222 | 2.49 | | |
| 321 | 2.49 | | |
| 103 | 2.47 | | |
| 312 | 2.44 | | |
| 411 | 2.38 | | |
| 113 | 2.36 | | |
| 203 | 2.31 | | |
| 500 | 2.30 | 2.30 | 5 |
| 402 | 2.29 | | |
| 330 | 2.21 | 2.21 | 22 |
| 501 | 2.20 | | |
| 213 | 2.19 | | |
| 420 | 2.18 | 2.18 | 2 |
| 322 | 2.17 | | |
| 331 | 2.13 | 2.13 | 4 |
| 303 | 2.11 | 2.11 | 2 |
| 412 | 2.09 | | |
| 421 | 2.09 | 2.09 | 2 |
| 510 | 2.07 | 2.07 | 2 |
| 223 | 2.01 | | |
| 511 | 1.99 | 1.99 | 2 |
| 313 | 1.98 | | |
| 502 | 1.97 | 1.97 | 2 |
| 600 | 1.92 | | |
| 332 | 1.91 | | |
| 403 | 1.90 | | |
| 004 | 1.89 | | |
| 430 | 1.89 | 1.89 | 1 |
| 422 | 1.88 | | |
| 104 | 1.87 | | |
| 601 | 1.86 | | |
| 520 | 1.84 | 1.84 | 3 |
| 431 | 1.83 | 1.83 | 5 |

Differences in the observed lines and the intensity of lines are obvious. Differences in the position of lines are not so obvious in the figure but are measurable. The x-ray data are consistent with a space group of P6̄m2 for offretite and of P6₃/mmc for erionite. Erionite characteristically has a more complex x-ray powder diffractometer pattern than offretite. Erionite commonly has double or triple lines, whereas, offretite has single or double lines. Observed lines at 9.07A, 7.51A, and 5.34A distinguish erionite from offretite. The two zeolites can be distinguished in mixture by an x-ray powder diffractometer technique using a slow scanning speed of 0.5° 2θ/min. The cell dimensions for offretite are $a_o =$ 13.29A and $c_o =$ 7.58A. Cell dimensions for analyzed erionite show the following ranges: $a_o =$ 13.21–13.25A, and $c_o =$ 15.04–15.12A. Thus, the $a_o$ dimension of offretite is larger than that of the erionites, and the doubled $c_o$ dimension of offretite is larger than the $c_o$ dimension of erionites.

The original chemical analysis of offretite published by Gonnard does not accurately characterize the zeolite. The molecular ratio $Al_2O_3(Ca,Mg,Na_2, K_2)_O$ for zeolites should be unity; however, this ratio for Gonnard's analysis is about 1.5. Thus, the $Al_2O_3$ content of Gonnard's analysis is greatly in excess of his reported CaO and $K_2O$ content. The new chemical analysis of the offretite from the original locality in France, shows that alkaline earths are greatly in excess of alkali and that the molecular ratio $SiO_2/Al_2O_3$ is about 4.97. Gonnard's analysis showed that potassium was the predominant cation and that the molecular ratio $SiO_2/Al_2O_3$ was 4.67. The total water content in the new analysis is very close to that in Gonnard's analysis. The molecular ratio $Al_2O_3/(Ca,Mg,Na_2,K_2)$ of the new analysis about 1.1, much closer to unity than the previous value. An interesting point is that neither Gonnard's analysis nor the present one shows $Na_2O$.

The analyses show that erionite is more silicieous than offretite and that the molecular ratio $SiO_2/Al_2O_3$ and cation contents are variable. Except for the specimen from Maze, Japan the erionites are alkali-rich. The molecular ratio $SiO_2/Al_2O_3$ ranges from 6.03 to 7.98.

The $Si/(Al+Fe^{+3})$ ratio for offretite is 2.48, whereas, the ratio for erionite ranges from 2.92 to 3.74. Only the erionite from Maze, Japan has a $Si/(Al+Fe^{+3})$ ratio less than three. Looking at the cation contents of erionite and offretite two observations can be made: (1) offretite does not have a sufficiently characteristic cation content to distinguish it from erionite, and (2) the atomatic percentage of potassium ranges from about 25 to 58, a narrow range compared to that of the other cations.

Offretite and erionite both are uniaxial but differ in optic sign; offretite is negative, whereas erionite is positive. Both are elongated parallel to the $c$ crystallographic axis. As the sign of elongation in the uniaxial crystals is the same as the optic sign, offretite has negative elongation and erionite has positive elongation. Thus, the sign of elongation, as easily determined property, seems sufficient to distinguish offretite from erionite. Indices of refraction for offretite are:

$$\Omega = 1.489 \text{ and } \epsilon = 1.486;$$

birefrengence is 0.003.
Indices of refraction for erionite are:

$\omega = 1.458–1.477$ and $\epsilon = 1.461–1.480$; bifringence is $0.003 – 0.005$ Sheppard and Gude (15) reported indices as low as $\omega = 1.455$ and $\epsilon = 1.459$ for an erionite sample from Lake Tecopa, California. Rare crystals from the Montbrison specimen are zoned from offretite (negative elongation) at the interior to erionite (positive elongation) at the exterior. Except for this erionite from zoned crystals, no erionite has indices of refraction higher than 1.48, and most erionites have indices below 1.47.

FIG. 3 is a plot of the minimum index of refraction versus the $Si/(Al+Fe^{+3})$ ratio for offretite and erionites from different localities as given by Sheppard and Gude. Although there is scatter for the erionites, the plot clearly shows a decrease in the minimum index of refraction with an increase in the $Si/(Al+Fe^{+3})$ ratio. Other factors like cation and water contents are also known to affect the index of refraction of zeolites and it probably accounts for the scatter of erionites.

The difference between erionite and offretite and their intergrowths and the resulting x-ray powder and single crystal electron data as summarized follow below:

Single crystal electron diffraction patterns have the following characteristics:
1. Fully ordered erionite crystals give sharp spots with 1-odd, weaker than those with k-even. For fully ordered offretite these spots are completely absent. Disordered intergrowths have streaks parallel to $c^*$ through the spots with 1-even; diffuse maxima on these streaks, centered on the lodd positions indicate the extent of erionite type stacking.
2. All natural erionite specimens examined were fully ordered; i.e., odd-1 spots in electron diffraction patterns are never streaked parallel to $c^*$.
3. In the natural offretite from Mt. Simionse, France some particles show disorder with streaks parallel to $c^*$ on electron diffraction patterns, and some have the diffuse maxima corresponding to a fair degree of erionite type stacking.

X-ray powder photos have the following characteristics:
1. Photos taken with Philips non-focusing cameras have only three unique reflections with 1-odd: 10.1, 9.16A; 20.1,5.37A; 21.1,4.17A.

2. Guinier-type focusing cameras give better resolution, and at least seven lines with 1-odd in erionite were detected: 10.1,9.16A; 20.1,5.37A; 21.1,4.16A; 21.3,3.29A; 31.1,3.12A; 40.1,2.83A; 32.5,2.33A.

Once it had been determined that there were substantial differences between erionite and offretite and that offretite had a 12-ringed structure, attempts were made to synthesize it. One successful attempt was reported by Whyte et al in the Journal of Catalysis 20, 88–96 (1971). Another attempt was reported by Aiello and Barrer in the Journal of the Chemical Society (A), 1970 at page 1470. In both cases, the synthesis of offretite took place by using TMA (tetramethyl-ammonium). Offretite made in this way has a number of deficiencies. First of all, the TMA occupies space in the chamber and, thus, inhibits catalytic activity. Secondly, the TMA may take part in the chemical reaction; while it is possible to remove the TMA from the product, this represents another expensive step in the process. Thirdly, the TMA is expensive. These and other difficulties experienced with the prior art processes have been obviated in a novel manner by the present invention.

It is, therefore, an outstanding object of the invention to provide a synthetic offretite free of stacking faults.

Another object of this invention is the provision of a method of producing a synthetic zeolite of the offretite-type inexpensively.

A further object of the present invention is the provision of a synthetic offretite-like zeolite which is free of undesirable organic cations.

It is another object of the instant invention to provide a synthetic offretite having no TMA occupying space in the chamber.

With the foregoing and other objects in view, which will appear as the description proceeds, the invention resides in the combination and arrangement of steps and the details of the composition hereinafter described and claimed, it being understood that changes in the precise embodiment of the invention herein disclosed may be made within the scope of what is claimed without departing from the spirit of the invention.

SUMMARY OF THE INVENTION

In general, the invention consists of preparing a synthetic zeolite having an offretite-like crystal structure. It consists essentially of aluminum, silicon, hydrogen, and oxygen. It has a silicon to aluminum ratio of greater than as synthesized as a result of acid treatment. It is capable of inter-crystalline absorption of benzene and molecules larger than 5A.

BRIEF DESCRIPTION OF THE DRAWINGS

The character of the invention, however, may be best understood by reference to one of its structural forms, as illustrated by the accompanying drawings, in which:

FIG. 1 is a line drawing of the cage and hexagonal layer system in offretite,

FIG. 2 is a diagrammatic representation of x-ray powder diffractometer patterns for offretite and erionite, FIG. 3 is a plot of the minimum index of refraction vs. the $Si/Al + Fe^{+3}$ ratio for offretite and erionite, and FIG. 4 is a flow diagram for a process embodying the principles of the present invention.

DESCRIPTION OF THE PREFERRED EMBODIMENT

According to the present invention, starting materials are weighed to give the desired batch composition, mixed in a mortar and pestle and loaded into a silver- or gold-lines 15ml capacity autoclave for hydrothermal synthesis. The autoclave then is sealed with an annealed silver disk and weighed. The weighing of autoclave before and after heating serves as a check to determine whether any of the starting material is lost due to leak. The cover of the autoclave is screwed on tightly using an impact wrench. The autoclave then is placed in an electric oven set at a predetermined temperature. On completion of the run the autoclave is taken from the oven and quenched in cold water. The autoclave is opened with the impact wrench, and after the cover and plunger are removed, the autoclave is weighed again for comparison with the initial weighing. The silver disk is broken and the product is dispersed in a mortar, suction filtered, washed and dried at 80° C. The dried sample then is ready for x-ray diffraction analysis and sorption studies.

The parameters that were evaluated in the synthesis program were the effect of starting materials, batch composition, temperature, time, rate of heatup, percent fill of the autoclaves, and order of mixing.

Different sources of silica, alumina, alkali, water gave different products. Aqueous colloidal silica sol (Ludox AS & SM, Dupont) and diatomite (Celite, Johns Manville) were evaluated as sources of silica. Aluminum hydroxide and sodium aluminate were evaluated as sources of alumina. Alkali was obtained from reagent grade sodium hydroxide and potassium hydroxide (Mallinckrodt).

The batch composition is the most important of all parameters. Various compositions were tried but only one composition was found to give the desired product in large yield. Evaluation of the effect of the autoclaving temperature was made in the range 100° C. to 150° C. Reaction times were varied in the range from a few hours to several days. The desired temperature was reached trying various rates of heatup as this affects nucleation and the resultant metastable crystalline product. Keeping all other parameters constant runs were made varying the amount of material in the autoclaves to study the effect of degree of fill. i.e., the proportion of volume occupied by vapor. Different orders of mixing the reactants were tried to determine if this had any effect on paths of crystallization.

Identification and characterization of the autoclaved products was made by x-ray powder diffraction (diffractometer, and film), and sorption analysis.

Sorption Analysis

The sample first is activated by heating it at 350° C. in a furnace for 16 hours and then immediately transferred to a desiccator filled with activated molecular sieve desiccant. FIG. 4 shows the sorption equipment used. The procedure used is given in step-by-step form below.
1. The weight of the empty pan is noted.
2. The pan then is weighed with about 20 mg of the sorbent sample on the pan.
3. The pan with the sample is attached to the quartz helix spring. The joints are greased carefully and the chamber is closed.
4. The cathetometer is leveled.
5. An artitrary point is chosen as reference and its height is noted.
6. The height of the bottom of the pan is also noted using cathetometer.
7. Using heating tape coils around the outside of the chamber, the degassing temperature is brought to about 300° C.
8. Degassing is carried out under vacuum for 16 hours.
9. Heating is stopped after degassing.
10. Stopcocks A and C are closed.
11. After the chamber reaches room temperature, the heating tape is removed.
12. The height of the reference point and pan are measured again.
13. Knowing the spring constant, the weight loss of the sample due to degassing can be calculated. Hence the net weight of the sample for the sorption can be calculated.
14. Sorption equilibria are determined at four or five different pressures.
15. Stopcock B is opened allowing sorbate vapor to enter the chamber until the desired pressure is reached at which time stopcock B is closed.
16. The stopwatch is started and time versus pressure changes are recorded.
17. Spring extension is measured by the cathetometer after each equilibrium.
18. When equilibrium is reached, stopcock B again is opened to introduce more vapor into the chamber.
19. Similarly readings are taken at different equilibrium pressures.
20. The vacuum pump is turned off.
21. The mercury bulb is lowered until the mercury in both the arms is lower than point T and air enters the tube.
22. Stopcock A is opened very slowly to admit air into the whole system; stopcock then is opened slowly to introduce air into the chamber.
23. The pan is taken away from the chamber and is cleaned for the next experiment.

X-ray Powder Diffraction Analysis

The dried sample is ground until it passes through a 200 mesh screen. The fine powder sample then is loaded either into a depression type holder or, if there is only a small amount of material available, a slide is made as follows: The sample is spread on a glass slide and, using distilled water, a thick, evenly distributed slurry is made along the top of the slide. The slide is then placed on a hot plate at a low setting to allow the excess water to evaporate slowly and cause the sample to form a thin solid cake on the slide. The sample then is analyzed using a G.E. XRD-5 diffractometer with Copper (Nickel filtered) radiations.

RESULTS

Results of Synthesis

Table 4 shows the results obtained for different batch compositions, time and temperature.

| TABLE OF SYMBOLS | |
|---|---|
| K | $K_2O$ |
| N | $Na_2O$ |
| A | $Al_2O_3$ |
| S | $SiO_2$ |
| H | $H_2O$ |
| Zeolex | $Na_2O\text{---}Al_2O_3\text{---}(SiO_2)_{10}$ |
| $KH_{2.1}$ | Potassium Hydroxide |
| NH | Sodium Hydroxide |
| $SH_{0.37}$ | Diatomite |
| $N_{1.1}AH_3$ | Sodium Aluminate |
| $SH_{7.7}$ | Ludox |

Table 4

Results of Synthesis

| Run No. | Batch Composition | Source of Silica | Temp. °C. | Time hrs. | Results |
|---|---|---|---|---|---|
| 702-1 | $K_{3.65}N_{10.35}AS_{28}H_{560}$ | Ludox | 120 | 8.00 | good phillipsite |
| 702-2 | " | " | " | 31.25 | excellent phillipsite |
| 702-3 | " | " | " | 80.00 | excellent phillipsite |
| 702-4 | " | " | " | 126.50 | excellent phillipsite |
| 708-1 | $K_2N$ hd $6AS_{20}H$ hd 320 | " | 100 | 100.75 | good phillipsite |
| 708-2 | " | " | " | 44.75 | good phillipsite |
| 708-3 | " | " | 120 | 42.75 | good phillipsite |

Table 4-continued

Results of Synthesis

| | | | | | |
|---|---|---|---|---|---|
| 708-4 | " | " | " | 24.00 | good phillipsite |
| 711-1 | $K_{2.91}N_{8.29}AS_{28}H_{470.4}$ | " | 100 | 166.00 | new phase |
| 711-2 | " | " | 120 | 69.25 | phillipsite + new phase |
| 711-3 | " | " | " | 69.25 | poor erionite |
| 717-1 | $K_{0.66}N_2AS_{12}H_{36}$ | Diatomite | 140 | 41.75 | medium erionite |
| 717-2 | " | " | " | 21.00 | erionite + offretite |
| 717-3 | " | " | " | 20.00 | phillipsite + new phase |
| 717-4 | $K_{0.66}N_2AS_{12}H_{57.84}$ | " | " | 26.00 | good phillipsite |
| 721-1 | $K_{2.8}N_{8.4}S_{28}AH_{448}$ | Ludox | 100 | 23.75 | amorphous |
| 721-2 | $K_{2.8}N_{8.4}AS_{28}H_{518}$ | Ludox | 100 | 23.00 | amorphous |
| 721-3 | " | " | 140 | 17.00 | erionite + phillipsite |
| 721-4 | $K_{2.8}N_{8.4}AS_{28}H_{588}$ | " | 100 | 23.00 | amorphous |
| 721-5 | " | " | 120 | 25.00 | amorphous |
| 721-6 | $K_2N_6AS_{20}H_{320}$ | " | 100 | 23.00 | amorphous |
| 721-7 | " | " | 120 | 21.00 | amorphous |
| 723-1 | $K_2N_6AS_{20}H_{370}$ | " | 100 | 24.00 | poor phillipsite |
| 723-2 | " | " | 120 | 24.00 | good phillipsite |
| 723-3 | $K_2N_6AS_{20}H_{420}$ | " | 100 | 24.00 | amorphous |
| 723-4 | " | " | 120 | 24.00 | phillipsite |
| 723-5 | $K_{2.75}N_{8.25}AS_{26}H_{416}$ | " | 100 | 24.00 | amorphous |
| 723-6 | " | " | 120 | 24.00 | phillipsite |
| 723-7 | $K_{2.75}N_{8.25}AS_{26}H_{481}$ | " | 100 | 24.00 | amorphous |
| 723-8 | " | " | 120 | 24.00 | phillipsite |
| 724-1 | $K_{2.75}N_{8.25}AS_{26}H_{546}$ | " | 120 | 24.00 | excellent phillipsite |
| 724-2 | " | " | 140 | 24.00 | excellent phillipsite |
| 725-1 | $K_{2.33}N_{6.98}AS_{22}H_{352}$ | " | 100 | 28.75 | amorphous |
| 725-2 | " | " | 120 | 28.75 | phillipsite |
| 725-3 | $K_{2.33}N_{6.98}AS_{22}H_{352}$ | Ludox | 140 | 28.75 | phillipsite excellent |
| 725-4 | $K_{2.33}N_{6.98}AS_{22}H_{407}$ | " | 100 | " | amorphous |
| 725-5 | " | " | 120 | " | phillipsite |
| 725-6 | " | " | 140 | " | excellent phillipsite |
| 725-7 | $K_{2.33}N_{6.98}AS_{22}H_{462}$ | " | 100 | " | amorphous |
| 725-8 | " | " | 120 | " | phillipsite |
| 725-9 | " | " | 140 | " | phillipsite |
| 728-1 | $K_{2.67}N_8AS_{24}H_{384}$ | " | 100 | 24.00 | phillipsite |
| 728-2 | " | " | 120 | " | phillipsite |
| 728-3 | " | " | 140 | " | excellent analcite |
| 728-4 | $K_{2.67}N_8AS_{24}H_{444}$ | " | 100 | " | poor phillipsite |
| 728-5 | " | " | 120 | " | poor phillipsite |
| 728-6 | " | " | 140 | " | good phillipsite |
| 728-7 | $K_{2.67}N_8AS_{24}H_{504}$ | " | 100 | " | phillipsite |
| 728-7 | $K_{2.67}N_8AS_{24}H_{504}$ | " | 100 | " | phillipsite |
| 728-8 | " | " | 120 | " | phillipsite |
| 728-9 | " | " | 140 | 24.00 | good phillipsite |
| 731-1 | $K_{2.91}N_{8.29}AS_{28}H_{470.4}$ | " | 120 | 22.80 | good phillipsite |
| 731-2 | $K_{2.91}N_{8.29}AS_{28}H_{470.4}$ | Ludox | 120 | 48.33 | god phillipsite |
| 731-3 | " | " | " | 72.00 | good phillipsite |
| 731-4 | " | " | " | 96.00 | good phillipsite |
| 731-5 | " | " | " | 120.00 | good phillipsite |
| 731-6 | " | " | " | 144.00 | good phillipsite |
| 801-1 | $K_{0.66}N_2AS_{12}H_{36}$ | Diatomite | 142 | 26.00 | erionite + offretite |
| 801-2 | " | " | 144 | 48.00 | erionite + quartz |
| 801-3 | " | " | 142 | 72.00 | good analcite |
| 801-4 | " | " | " | 96.00 | erionite + offretite |
| 801-5 | " | " | 140 | 120.00 | amorphous |
| 801-6 | " | " | 140 | 140.00 | amorphous |
| 811-1 | $K_{2.91}N_{8.29}AS_{28}H_{470.4}$ | Ludox | 120 | 48.00 | new phase |
| 811-2 | " | " | " | 70.50 | phillipsite |
| 811-3 | " | " | " | 95.00 | poor erionite |
| 811-4 | " | " | 140 | 29.50 | very poor erionite |
| 811-5 | " | " | " | 48.00 | phillipsite |
| 812-1 | $K_{0.66}N_2AS_{12}H_{36}$ | Diatomite | " | 26.00 | offretite + erionite |
| 812-2 | " | " | " | 30.00 | poor offretite and erionite |
| 812-3 | $K_{0.66}N_2AS_{12}H_{36}$ | Diatomite | 140 | 34.00 | new phase |
| 812-4 | " | " | " | 54.00 | new phase |
| 812-5 | " | " | " | 74.50 | offretite + erionite |
| 812-6 | " | " | " | 96.50 | poor offretite + erionite |
| 812-7 | " | " | " | 100.00 | amorphous |
| 812-8 | " | " | " | 145.75 | new phase |
| 822-1 | " | " | " | 69.00 | amorphous |
| 822-2 | " | " | " | 71.00 | amorphous |
| 822-3 | " | " | " | 72.00 | amorphous |
| 822-4 | " | " | " | 74.50 | poor offretite + erionite |
| 822-5 | " | " | " | 75.75 | amorphous |
| 822-6 | " | " | " | 78.5 | amorphous |
| 822-7 | " | " | 150 | 91.00 | amorphous |
| 822-8 | " | " | " | 93.00 | amorphous |
| 822-9 | " | " | " | 95.00 | amorphous |
| 822-10 | $K_{2.91}N_{8.29}AS_{28}H_{470.4}$ | Ludox | 123 | 70.00 | phillipsite |
| 822-11 | " | " | " | 74.25 | phillipsite |

Table 4-continued

Results of Synthesis

| Run | Batch Composition | Source of Silica | Temp. °C | Time hrs. | Results |
|---|---|---|---|---|---|
| 822-12 | " | " | " | 90.16 | phillipsite |
| 822-13 | $K_{2.91}N_{8.29}AS_{28}H_{470.4}$ | Ludox | 123 | 92.00 | phillipsite |
| 822-14 | " | " | " | 94.00 | phillipsite |
| 825-1 | $K_{0.66}N_2AS_{12}H_{36}$ | Diatomite | 142 | 24.00 | offretite + erionite |
| 825-2 | " | " | " | 25.16 | analcite |
| 825-3 | " | " | " | 26.00 | analcite |
| 825-4 | " | " | " | 28.00 | analcite |
| 825-5 | " | " | " | 29.00 | erionite + phillipsite |
| 911-1 | $K_{0.66}N\ hd\ 1.98AS_{12}H52-87$ | " | 140 | 18.00 | amorphous |
| 911-2 | " | " | " | 19.00 | amorphous |
| 911-3 | " | " | " | 21.00 | amorphous |
| 911-4 | " | " | " | 22.00 | amorphous |
| 911-5 | " | " | " | 23.50 | amorphous |
| 917-1 | $K_{0.66}N_2AS_{12}H_{36}$ | " | " | 18.16 | amorphous |
| 917-2 | " | " | " | 19.00 | amorphous |
| 917-3 | " | " | " | 20.00 | amorphous |
| 917-4 | " | " | " | 21.00 | amorphous |
| 917-5 | " | " | " | 22.15 | offretite + erionite |
| 917-6 | $K_{0.66}N\ hd\ 2AS_{12}H_{36}$ | Diatomite | 140 | 23.00 | amorphous |
| 917-7 | " | " | 140 | 24.00 | amorphous |
| 917-8 | " | " | 140 | 25.00 | amorphous |
| 922-1 | " | " | 140 | 21.25 | amorphous |
| 922-2 | " | " | 140 | 21.50 | offretite + erionite |
| 922-3 | " | " | 140 | 21.75 | offretite + erionite |
| 922-4 | " | " | 140 | 22.00 | offretite + erionite |
| 922-5 | " | " | 140 | 22.25 | offretite + erionite |
| 922-6 | " | " | 140 | 22.50 | amorphous |
| 922-7 | " | " | 140 | 22.75 | amorphous |
| 922-8 | " | " | 140 | 23.00 | amorphous |
| 922-9 | " | " | 140 | 24.00 | amorphous |
| 929-1 | $K_{0.857}N_2AS_{12}H_{36}$ | " | 140 | 24.00 | amorphous |
| 929-2 | " | " | 140 | 22.00 | amorphous |
| 929-3 | " | " | 140 | 24.00 | amorphous |
| 929-4 | $K_{0.5}N_2AS_{12}H_{36}$ | " | 140 | 22.00 | offretite + erionite |
| 930-1 | $K_{0.66}N\ hd\ 2AS_{12}H_{30}$ | " | 140 | 20.00 | amorphous |
| 930-2 | $K_{0.66}N_2AS_{12}H_{30}$ | Diatomite | 140 | 21.00 | amorphous |
| 930-3 | " | " | 140 | 21.75 | erionite + phillipsite |
| 1003-1 | $K_{0.66}N\ hd\ 2AS_{12}H_{48}$ | " | 140 | 70.66 | amorphous |
| 1003-2 | " | " | 140 | 72.66 | erionite + new phase |
| 1006-1 | " | " | 140 | 22.16 | amorphous |
| 1006-2 | " | " | 140 | 23.50 | amorphous |
| 1012-1 | $K_{0.35}N_2AS_{12}H_{36}$ | " | 140 | 21.00 | amorphous |
| 1012-2 | " | " | 140 | 22.16 | amorphous |
| 1014-1 | $K_{0.798}N_{1.862}AS_{12}H_{36}$ | " | 140 | 21.00 | erionite + offretite + phillipsite |
| 1014-2 | " | " | 140 | 22.25 | amorphous |
| 1017-1 | $K_{0.66}N\ hd\ 2AS_{12}H_{36}$ | " | 140 | 22.00 | amorphous |
| 1017-2 | " | " | 140 | 22.00 | poor erionite + phillipsite |
| 1017-9 | " | " | 140 | 75.41 | amorphous |
| 1024-1 | " | " | 140 | 22.00 | offretite + erionite |
| 1024-2 | " | " | 140 | 24.00 | amorphous |
| 1024-3 | " | " | 140 | 25.00 | amorphous |

| Run No. | Batch Composition wt. % | Source of Silica | Temp. °C | Time hrs. | Results |
|---|---|---|---|---|---|
| ZCH-1 | 29.02H;5.22KH$_{2.1}$; 4.25 NH; 47.83SH$_{.33}$; 13.55N$_{1.1}$AH$_3$ | | 142 | 24 | offretite − erionite + phillipsite (large 5 liter autoclave) |
| ZCH-2 | " | | 142 | 21 | amorphous (small autoclave) |
| ZCH-3 | " | | 142 | 22 | amorphous (small autoclave) |
| ZCH-4 | " | 25% sodium silicate; 75% diatomite | 142 | 22.5 | amorphous (small autoclave) |
| ZCH-5 | " | " | 142 | 24 | mordenite + phillipsite |
| ZCH-6 | " | fumed silica | 142 | 22.5 | amorphous (very difficult to mix because very dry) |
| ZCH-7 | " | " | 142 | 24 | amorphous (very difficult to mix because very dry) |
| ZCH-8 | " | 25% sodium silicate + 75% fumed silica | 142 | 22.5 | amorphous (very difficult to mix because very dry) |
| ZCH-9 | " | " | 142 | 24 | amorphous |
| ZCH-10 | " | ⅓ Ludox; ⅔ fumed silica | 142 | 22.5 | amorphous |
| ZCH-11 | " | " | 142 | 24 | amorphous |
| ZCH-12 | 2.03N$_{1.1}$AH$_3$ 51.34SH$_{7.7}$ 5.22NH 3.20KH$_{2.1}$ 38.68H$_2$O | Ludox | 118 | 70.75 | good erionite very soft + light |
| ZCH-13 | " | Ludox | 140 | 20 | amorphous |
| ZCH-14 | 41.78H$_2$o 4.21KH$_{2.1}$ 3.80NH 38.34SH$_{.33}$ 11.84N$_{1.1}$AH$_3$ | " | 142 | 21 | poor offretite + erionite |
| ZCH-15 | " | " | 142 | 22.0 | poor offretite + erionite |
| ZCH-16 | " | " | 142 | 23.0 | medium offretite + erionite |
| ZCH-17 | " | " | 142 | 24 | medium offretite + erionite |
| ZCH-18 | 29.02H;5.22KH$_{2.1}$ 4.35NH;47.83SH | " | 142 | 21 | poor offretite + erionite |

Table 4-continued

Results of Synthesis

| | | | | | |
|---|---|---|---|---|---|
| ZCH-19 | 13.55$N_{1.1}AH_3$ | " | 142 | 22 | poor offretite + erionite |
| ZCH-20 | " | " | 142 | 23 | amorphous |
| ZCH-21 | " | " | 142 | 24 | amorphous |
| ZCH-22 | " | " | 142 | 23 | amorphous |
| ZCH-23 | " | Zeolex + Ludox | 140 | 28.5 | amorphous |
| ZCH-23A | " | " | 140 | 22 | amorphous |
| ZCH-24 | " | " | 140 | 24.0 | amorphous |
| ZCH-25 | " | " | 140 | 27 | amorphous |
| ZCH-26 | 29.02H; 5.22$KH_{2.1}$ 4.35NH;47.83SH | " | 160 | 16 | medium offretite + erionite |
| ZCH-27 | 13.55$N_{1.1}AH_3$ | " | 160 | 19.5 | amorphous |
| ZCH-28 | " | " | 142 | 16 | amorphous |
| ZCH-29 | " | " | 142 | 19.5 | amorphous |
| ZCH-52 | " | " | 140 | 22.5 | amorphous |
| ZCH-63 | " | " | 142 | 23 | amorphous (very poorly crystallized) |
| ZCH-65 | " | " | 142 | 23 | amorphous (very poorly crystallized) |
| ZCH-72 | 29.02H; 5.22$KH_{2.1}$ 4.35NH 47.83$SH_{33}$ | " | 142 | 23 | amorphous (very poorly crystallized) |
| ZCH-78 | 13.55$N_{1.1}AH_3$ | " | 142 | 23 | amorphous (very poorly crystallized) |
| ZCH-79 | " | " | 142 | 23 | amorphous (very poorly crystallized) |
| ZCH-83 | " | ' | 142 | 23.5 | amorphous (very poorly crystallized) |
| ZCH-84 | " | " | 143 | 22.5 | amorphous (very poorly crystallized) |
| ZCH-85$_i$ | " | " | 143 | 21.5 | amorphous |
| ZCH-85$_{ii}$ | " | " | 143 | 22 | amorphous |
| ZCH-86$_i$ | " | " | 142 | 24.0 | good offretite |
| ZCH-86$_{ii}$ | " | " | 142 | 23.5 | good offretite |
| ZCH-86$_{iii}$ | " | " | 142 | 23.0 | good offretite |
| ZCH-86$_{iv}$ | " | " | 142 | 22.5 | good offretite |
| ZCH-86$_v$ | " | " | 142 | 22.5 | good offretite |
| ZCH-87 | " | " | 142 | 23 | offretite |
| ZCH-93 | " | " | 142 | 23 | offretite |

Different ratios of N+K/S, N+K/H, S/A were tried. With the aqueous colloidal silica sol (Ludox) the ranges of the ratios were as follows:

(N/N+K)   0.7 to 0.8

(N+K/S)   0.4 to 0.5

(S/A)     20 to 28

(H/N+K)   40 to 42 the desired phase was obtained when ratios were:

(N/N+K)   0.74

(N+K/S)   0.4

(S/A)     28.0

(H/N+K)   42.0 above ratios gave batch composition:

$N_{8.29}K_{2.91}AS_{28}H_{470.4}$

Using diatomite the ranges tried were:

(N/N+K)   0.7 to 0.8

(S/N)     5.5 to 6.5

(S/A)     11 to 15

(H/S)     3 to 6

The batch composition which gave the desired phase was:

$K_{0.65}N_2S_{12}AH_{36.11}$ slight deviation from this composition resulted in giving amorphous material.

When the aqueous colloidal silica sol was used, the temperature required was 120° C. and the time interval of 69 hours was necessary for good crystallization. With diatomite as the source of silica, considerably higher temperature was required; the zeolite phase was obtained at the temperature of 140° C. to 145° C. and time interval of 22 hours. The pressure was that corresponding to the vapor pressure of water in equilibrium with the mixture of reactant. This shows that at higher temperature, time required for crystallization was considerably less and also that diatomite required higher temperature than aqueous colloidal silica sol. Very accurate time measurements were necessary, for a deviation of more than half an hour on either side resulted in giving amorphous phase. In case of using diatomite, the final temperature was 140° C. and the time interval was 22 hours, under these conditions the autoclave was initially heated for 3 hours at 145° C. and then the temperature was reduced to 140° C. and kept there for rest of the period. This had been found to improve the crystallization of the zeolite.

From the results of the runs made varying the degree of fill, it can be seen that the desired phase was obtained only when the autoclave was filled to ¼ of its capacity; all other autoclaves gave amorphous phase. Knowing the amount of material used, we can find out the composition of the vapor phase and hence using new batch composition we can fill the autoclave completely and yet obtain the same yield as before.

Different orders of mixing the reactant were tried but no preferable order was found. Hence, the order of mixing used in most of the runs was from the point of convenience, i.e., water was taken first and then sodium hydroxide and potassium hydroxide were added and after dissolving them completely sodium aluminate was added and the diatomite was mixed last.

Results of X-ray Diffraction

Table 5 shows the $d$ spacings and the intensities obtained for the synthetic zeolite.

Results of Sorption

Various sorption runs were made using different sorbents and sorbates. A cathetometer was used to find the amount of sorbate sorbed at equilibrium.

X-ray Powder Diffraction Data of Sample From The Run No 917-5

| Intensity | d A |
|---|---|
| vs | 11.387 |
| vvw | 9.237 |
| vvw | 8.365 |
| vw | 7.736 |
| vw | 7.195 |
| S | 6.790 |
| vw | 5.508 |
| W | 5.116 |
| W | 4.656 |
| M | 4.424 |
| VS | 3.827 |
| S | 3.644 |
| W | 3.385 |
| VS | 3.200 |
| VS | 2.884 |
| M | 2.708 |
| vw | 2.603 |
| M | 2.512 |
| M | 1.885 |
| vw | 1.831 |
| M | 1.769 |
| M | 1.646 |
| M | 1.573 |
| M | 1.414 |
| vw | 1.364 |
| W | 1.311 |
| vw | 1.252 |
| S | 1.196 |

It can be seen that when aqueous colloidal silica sol was used as the source of silica, the desired phase was obtained at 120° C. and 69 hours. While, when diatomite was used to supply the necessary amount of silica, the desired phase was obtained at 140° C. and 22 hours. The batch compositions in both cases were quite different. The quality of the crystalline product was better in the latter case. Temperature of autoclaving was found to be an important parameter and in the case of diatomite as starting material the permissible range was 140°–145° C. with a faster rate of heatup in the beginning. Temperatures lower than 140° C. or higher than 145° C. were found to give either non-desirable zeolite phases or amorphous phases. Time interval is found to be even more critical parameter. At 140° C., 22 hours were required to give good crystalline phase. In the normal crystallization of a zeolite phase, after the desired phase has been 100% crystallized, it remains stable for certain time period and then slowly starts to decay as another crystalline phase starts to appear. While in the present work, the crystalline phase remained stable for a very short time. Also, the rates of crystallization and decay were very rapid and instead of resulting into another crystalline phase, it decayed back to amorphous phase.

From the powder x-ray data obtained, it is obvious that the crystalline phase obtained is a mixture of erionite and offretite. The identification of the two phases is easier when diffractometer is run at slow speed of 0.4 2θ°/min. From the film patterns obtained, the crystalline phases are identified and $d$ spacings are calculated.

The values of $d$ spacings found experimentally are in good agreement with the reported values.

Two main sorbates used were n-pentane and benzene. The reason for using these was to distinguish between erionite and offretite. Erionite has cavities with elliptical openings with major and minor axes of 4.7–5.2A and 3.5A respectively. While offretite has a twelve-membered channel with a free diameter of 7.6A. Hence, while benzene can easily be sorbed by offretite, it cannot enter the cavities of erionite.

The sorption data shows that the synthetic zeolite prepared sorbed 0.512mmoles of benzene per gram of sample at $P/P_s = 0.668$, while natural erionite sorbed only 0.0145 mmoles of benzene per gram at $P/P_s = 0.536$. From these data it is obvious that the synthetic material consists primarily of offretite containing no stacking faults.

While it will be apparent that the illustrated embodiments of the invention herein disclosed are well calculated adequately to fulfill the objects and advantages primarily stated, it is to be understood that the invention is susceptible to variation, modification, and change within the spirit and scope of the subjoined claims.

The invention having been thus described, what is claimed as new and desired to secure by Letters Patent is:

1. A method for making a zeolite having the structure of offretite, as determined by x-ray defraction, and capable of absorbing 0.512 mmoles of benzene per gram of zeolite at P/Ps of 0.669, comprising reacting in a closed container filled with a composition of ¼ of its capacity under autogenous pressure and in the absence of tetramethylammonium ions, the composition having oxide mole ratios of:

$$(K_2O)\ 0.65(Na_2O)_2(SiO_2)_{12}(Al_2O_3)\ (H_2O)\ 36.11$$

wherein the source of silica is diatomite the composition being maintained at a temperature of between approximately 140° C. and 145° C inclusive, for a time sufficient to form the zeolite.

2. The method as recited in claim 1, wherein the time is 22 hours.

3. A method for making a zeolite having the structure of offretite, as determined by x-ray defraction, and capable of absorbing 0.512 mmoles of benzene per gram of zeolite at P/Ps of 0.668 comprising reacting in a closed container filled to ¼ its capacity under autogenous pressure and in the absence to tetramethylammonium ions, a composition having oxide mole ratios of:

$$Na_2O/Na_2O+K_2O = 0.74$$

$$Na_2O+K_2O/SiO_2 = 0.4$$

$$SiO_2/Al_2O_3 = 28$$

$$H_2O/Na_2O+K_2O = 42$$

wherein the source of silica is an aqueous colloidal silica sol, the composition being maintained at a temperature of approximately 120° C for a time sufficient to form the zeolite.

4. A method as recited in claim 3, wherein the time is 69 hours.

* * * * *